(12) United States Patent
Lengsfeld et al.

(10) Patent No.: US 9,149,990 B2
(45) Date of Patent: Oct. 6, 2015

(54) APPARATUS FOR THE FORMING OF A LAY-UP OF FIBRE COMPOSITE MATERIAL

(75) Inventors: Hauke Lengsfeld, Helmste (DE); Olaf Rocker, Stade (DE); Rainer Graeber, Stade (DE)

(73) Assignee: Airbus Operations GmbH, Hamburg (DE)

( * ) Notice: Subject to any disclaimer, the term of this patent is extended or adjusted under 35 U.S.C. 154(b) by 1156 days.

(21) Appl. No.: 12/080,019

(22) Filed: Mar. 31, 2008

(65) Prior Publication Data

US 2009/0324765 A1    Dec. 31, 2009

Related U.S. Application Data

(60) Provisional application No. 60/921,049, filed on Mar. 30, 2007.

(51) Int. Cl.
| | |
|---|---|
| *B28B 7/42* | (2006.01) |
| *B29C 70/30* | (2006.01) |
| *B29C 33/04* | (2006.01) |
| *B29C 33/06* | (2006.01) |

(Continued)

(52) U.S. Cl.
CPC ............... *B29C 70/30* (2013.01); *B29C 33/04* (2013.01); *B29C 33/06* (2013.01); *B29C 35/02* (2013.01); *B29C 33/02* (2013.01); *B29C 33/30* (2013.01); *B29C 35/041* (2013.01); *B29C 2035/0811* (2013.01); *B29C 2035/0855* (2013.01)

(58) Field of Classification Search
CPC ........ B29C 39/00; B29C 70/00; B29C 70/30; B29C 33/06; B29C 33/04; B35C 35/02
USPC ........ 425/174.6, 174.8 R, 404, 508, 185, 384
See application file for complete search history.

(56) References Cited

U.S. PATENT DOCUMENTS

| | | | |
|---|---|---|---|
| 958,459 | A | 5/1910 | Ames |
| 3,195,186 | A * | 7/1965 | Gauban et al. ................ 425/590 |

(Continued)

FOREIGN PATENT DOCUMENTS

| | | |
|---|---|---|
| DE | 1 942 977 | 3/1971 |
| DE | 2 260 333 | 6/1974 |

(Continued)

OTHER PUBLICATIONS

Illig, Thermoformen in der Praxis, Section 5.3 Heizungsarten, pp. 119-135, 1997 Carl Hanser Verlag Munchen Wien, Germany.

(Continued)

*Primary Examiner* — Nahida Sultana
(74) *Attorney, Agent, or Firm* — Greer, Burns & Crain Ltd.

(57) ABSTRACT

An apparatus for the forming of a lay-up of fiber composite material, in particular in the aerospace sector is provided. In this case, the apparatus has at least one forming tool, which has a surface contour corresponding to a desired geometry of the lay-up after the forming, and a tool carrier, to which the at least one forming tool is releasably fastened. From a further viewpoint, the invention makes available an apparatus with a modular structure, it then being possible for any desired forming tools to be combined with the tool carrier according to requirements. This leads in particular to less laborious handling, since it obviates the need for handling of the comparatively large tool carrier.

9 Claims, 7 Drawing Sheets

(51) Int. Cl.
  *B29C 35/02* (2006.01)
  *B29C 33/02* (2006.01)
  *B29C 33/30* (2006.01)
  *B29C 35/04* (2006.01)
  *B29C 35/08* (2006.01)

(56) References Cited

U.S. PATENT DOCUMENTS

| | | | | |
|---|---|---|---|---|
| 4,473,346 | A * | 9/1984 | Hehl | 425/183 |
| 4,576,775 | A * | 3/1986 | Kaeufer et al. | 264/323 |
| 4,718,153 | A * | 1/1988 | Armitage et al. | 29/91.1 |
| 5,200,251 | A * | 4/1993 | Brand | 428/156 |
| 5,372,755 | A | 12/1994 | Stoerr et al. | |
| 5,413,456 | A * | 5/1995 | Kulak et al. | 415/9 |
| 5,580,502 | A * | 12/1996 | Forster et al. | 264/46.5 |
| 5,591,370 | A * | 1/1997 | Matsen et al. | 219/645 |
| 5,593,700 | A * | 1/1997 | Stilgenbauer | 425/3 |
| 5,609,891 | A * | 3/1997 | Delaunay et al. | 425/174.8 E |
| 5,771,680 | A * | 6/1998 | Zahedi et al. | 60/226.1 |
| 5,824,246 | A * | 10/1998 | Reetz | 264/122 |
| 6,012,883 | A * | 1/2000 | Engwall et al. | 409/132 |
| 6,017,484 | A * | 1/2000 | Hale | 264/510 |
| 6,064,352 | A * | 5/2000 | Silverman et al. | 343/912 |
| 6,103,061 | A * | 8/2000 | Anderson et al. | 162/108 |
| 6,261,675 | B1 * | 7/2001 | Hsiao et al. | 428/219 |
| 6,340,422 | B1 * | 1/2002 | Vries et al. | 205/137 |
| 6,692,681 | B1 * | 2/2004 | Lunde | 264/510 |
| 6,846,448 | B2 * | 1/2005 | Rymer et al. | 264/460 |
| 7,226,559 | B2 * | 6/2007 | Maxwell et al. | 264/511 |
| 7,470,639 | B2 * | 12/2008 | Angelini et al. | 442/384 |
| 7,732,047 | B2 * | 6/2010 | Kashikar et al. | 428/392 |
| 7,897,239 | B2 * | 3/2011 | Koon et al. | 428/116 |
| 7,955,548 | B2 * | 6/2011 | Buckley | 264/496 |
| 8,025,751 | B2 * | 9/2011 | Zafiroglu | 156/148 |
| 2003/0119402 | A1 * | 6/2003 | Melius et al. | 442/327 |
| 2004/0001902 | A1 * | 1/2004 | Winkler | 425/432 |
| 2004/0169321 | A1 * | 9/2004 | Tanaka et al. | 264/449 |
| 2005/0023414 | A1 * | 2/2005 | Braun | 244/120 |
| 2005/0035499 | A1 * | 2/2005 | Beckmann | 264/415 |
| 2005/0115743 | A1 * | 6/2005 | Griffo | 175/426 |
| 2005/0236735 | A1 * | 10/2005 | Oldani et al. | 264/257 |
| 2005/0285304 | A1 * | 12/2005 | Rodrigo Perez et al. | 264/259 |
| 2006/0013913 | A1 * | 1/2006 | Gerhard et al. | 425/384 |
| 2006/0062973 | A1 * | 3/2006 | Wilson | 428/188 |
| 2006/0108058 | A1 * | 5/2006 | Chapman et al. | 156/245 |
| 2008/0136060 | A1 * | 6/2008 | Shpik et al. | 264/319 |
| 2009/0130939 | A1 * | 5/2009 | Kimura et al. | 442/364 |
| 2009/0324765 | A1 * | 12/2009 | Lengsfeld et al. | 425/174.2 |
| 2010/0289188 | A1 * | 11/2010 | Graeber et al. | 264/490 |
| 2011/0028060 | A1 * | 2/2011 | Wakeman et al. | 442/131 |
| 2011/0198025 | A1 * | 8/2011 | Buckley | 156/242 |
| 2012/0108136 | A1 * | 5/2012 | Elia et al. | 442/394 |
| 2012/0114973 | A1 * | 5/2012 | Jacobsen et al. | 428/686 |
| 2012/0273989 | A1 * | 11/2012 | Graf | 264/148 |
| 2013/0099428 | A1 * | 4/2013 | Conley et al. | 264/571 |
| 2013/0146116 | A1 * | 6/2013 | Jovovic et al. | 136/200 |

FOREIGN PATENT DOCUMENTS

| | | |
|---|---|---|
| DE | 113183 | 5/1975 |
| DE | 102004042422 | 3/2006 |

OTHER PUBLICATIONS

German Office Action, Nov. 16, 2007.

* cited by examiner (A)

# APPARATUS FOR THE FORMING OF A LAY-UP OF FIBRE COMPOSITE MATERIAL

CROSS-REFERENCE TO RELATED APPLICATIONS

This application claims the benefit of U.S. Provisional Application No. 60/921,049 filed Mar. 30, 2007, the entire disclosure of which is herein incorporated by reference.

FIELD OF THE INVENTION

The present invention relates to an apparatus for the forming of a lay-up of fibre composite material, in particular in the aerospace sector.

BACKGROUND OF THE INVENTION

According to the current state of the art, the hot forming of a lay-up of fibre composite material is performed by means of a solid metal tool, which has a surface contour corresponding to a desired geometry of the lay-up after the forming. After the hot forming, the pre-fabricated scrim is cured, in particular in an autoclave, to form a component.

This means that, to produce components with different geometries, for example T or L stringers, a large number of different solid metal tools are required.

A disadvantageous effect here has been found to be the fact that a change in the geometry of the component to be produced, for example with regard to the layer structure, apertures or ramps, makes it necessary to perform laborious modification work on the solid metal tool, even to the extent that it has to be exchanged entirely. For example, the application of material to the surface contour of the solid metal tool for an altered geometry of the component to be produced represents a considerable problem, since it is possible only to a very limited extent, with the result that in many cases the solid metal tool has to be exchanged entirely.

Furthermore, owing to their size—up to 35 meter in length—and resultant great weight, handling such solid metal tools, for example for the modification work described, is very laborious.

SUMMARY OF THE INVENTION

It is therefore an object of the present invention to provide an apparatus for the forming of a lay-up of fibre composite material with which a change in the geometry of the component to be produced only necessitates modifications to the apparatus that involve little effort.

This object is achieved according to the invention by an apparatus with the features of Patent Claim 1.

Accordingly, an apparatus for the forming of a lay-up of fibre composite material, particular in the aerospace sector, is provided, comprising at least one forming tool, which has a surface contour corresponding to a desired geometry of the lay-up after the forming, and a tool carrier, to which the at least one forming tool is releasably fastened.

One idea on which the present invention is based is that a modular structure is provided for the apparatus, it being possible according to requirements for the at least one forming tool to be easily exchanged for another forming tool, which has for example a different desired surface contour or is formed from a material, for example a ceramic, that is particularly well suited for a specific forming operation. This obviates the need for laborious handling of the entire apparatus, that is to say the tool carrier with the forming tool.

Advantageous refinements and improvements of the invention can be found in the subclaims.

A "lay-up of fibre composite material" is to be understood in the present case as meaning woven fibre fabrics and/or laid fibre scrims, in particular tape scrims, which preferably have a layer structure. With preference, the fibres in the tape scrim are oriented in an optimized manner with regard to the loading of the components to be produced by forming and curing. The laid fibre scrims and/or woven fibre fabrics are impregnated with a matrix, in particular an epoxy resin matrix.

According to a development, the forming tool is releasably fastened to the tool carrier by means of a vacuum clamping device and/or locking device. This makes very rapid fastening and release of the forming tool possible. This allows the setup time for the apparatus to be shortened.

In the case of a further embodiment, the locking device has at least one locking element, which in a locking state positively connects the forming tool to the tool carrier in one plane and in a release position permits a movement of the forming tool in relation to the tool carrier in the plane. That is to say that, in the locking state, the forming tool is not movable in the plane because of the positive engagement and is merely movable in a direction perpendicular to the plane. The plane is in this case typically formed as a resting surface of the forming tool on the tool carrier. A positive connection is advantageous to the extent that it can be rapidly closed but also released again.

In the case of a development of the invention, the locking device has at least two locking elements, which positively connect the forming tool and the tool carrier to one another in at least two planes forming an angle in relation to one another. As already described, one of the planes is typically a resting surface of the forming tool on the tool carrier. The other plane is typically a bearing surface, which preferably forms an angle of approximately 90° in relation to the resting surface. If there is a positive connection, which prevents a movement of the forming tool in the respective plane, that is to say the resting surface or bearing surface, by positive engagement, the tool for the forming operation is fixed in all three spatial directions. Such fastening of the forming tool to the tool carrier is advantageous to the extent that consequently no undercut surfaces have to be formed on the forming tool to achieve gripping from behind thereof and consequently a fixed connection between the tool carrier and the forming tool. Coming into consideration as locking elements are, for example, pins or pegs, which preferably extend perpendicularly in relation to the respective plane into a recess in the forming tool and a recess in the tool carrier, respectively.

In the case of a further development of the invention, the at least one locking element can be moved from the locking state into the releasing state by means of compressed air and/or from the releasing state into the locking state by means of at least one spring. An exchange of the forming tool is carried out at comparatively great time intervals, for example a day, with the result that the locking element is usually in the locking state. It is therefore advantageous if the locking element is kept in the locking state under spring biasing, with the result that no auxiliary energy is required in the locking state. For moving the locking element into the releasing state, which takes place correspondingly rarely, auxiliary energy is supplied, for example in the form of compressed air. Consequently, by means of this development, the device has high energy efficiency.

In the case of a further embodiment of the invention, the vacuum clamping device has a pressure surface fixedly connected to the forming tool and a pressure surface fixedly connected to the tool carrier, it being possible for a vacuum to be applied between the surfaces for fastening of the forming tool. This advantageously produces a very simple structure, since there is no longer any need for the provision of mechanical locking elements that are movable in relation to one another, such as for example pegs in corresponding bushes. It also increases the operational reliability of the apparatus, since mechanical elements that are moved in relation to one another fail comparatively easily. The pressure surfaces are preferably formed by corresponding surfaces of the forming tool and of the tool carrier.

According to a further preferred embodiment, a heating device which heats the lay-up for the forming is provided. As a result, the operation of forming the lay-up is speeded up considerably.

In the case of a further development of the invention, the heating device is formed as a microwave heater, which feeds microwaves directly into the lay-up, in particular into the fibres. The heating power that can be fed directly into the lay-up by means of microwaves is comparatively great. If, for example, the apparatus is formed from solid plastic, the microwaves merely generate the heating power in the lay-up. Consequently, very targeted introduction of the heating power is possible, which on the one hand leads to a reduction in the time required for heating the scrim that is to be formed and on the other hand leads to very low energy consumption.

In the case of a further embodiment of the invention, the heating device is formed as at least one fluid-carrying line in the forming tool and/or the tool carrier. Pressurized hot water, for example at a temperature of 100° Celsius, comes into consideration for example as the fluid. Rapid heating of the lay-up can also be achieved in this way.

According to a further embodiment, the heating device is formed in the forming tool and/or the tool carrier as a resistance heating element, in particular a heating strip. A "resistance heating element" is to be understood as meaning a high-impedance resistance element, which generates a heating power in the state in which current is flowing through it. A "heating strip" is to be understood as meaning in particular sheet-like woven fabrics of such resistance heating elements. By means of these resistance heating elements, heat can be introduced in a very targeted manner into specific regions of the lay-up.

According to a further development, the heating device is formed as a high-impedance metallic region of the forming tool and/or of the tool carrier and as an induction device for inducing a current in the high-impedance metallic region. The high-impedance metallic region may comprise, for example, a mixture of plastic and metal powder. Preferably, the high-impedance metallic region in this case merely forms a surface region of the forming tool with a small thickness on a non-metallic substrate of the forming tool. With further preference, according to this development the tool carrier is likewise formed from a non-metallic material, for example plastic. This allows a very high and targeted, but if desired also uniform, introduction of heating power into the lay-up. In comparison with heating systems known from the prior art that use infrared radiation for heating a lay-up, very much faster heating of the lay-up can be achieved in this way.

In the case of a further development, at least two heating devices are provided, by means of each of which a region of the forming tool can be subjected to a different heating power. For example, lay-ups often vary in thickness in different regions and therefore require correspondingly adapted and specifically targeted introduction of heating power. These requirements can easily be met by at least two heating devices which can be controlled with regard to the heating power generated by them. In particular, the heating devices are in this case formed as resistance heating elements or as a number of high-impedance, metallic regions that are separate from one another.

According to a further development, the heating device can also be switched to cooling of the lay-up after the forming. Consequently, very rapid solidification of the matrix in the lay-up softened by the heating can be achieved after the forming. The cooling time can therefore be shortened, which altogether reduces the process time for each lay-up on the forming tool.

BRIEF DESCRIPTION OF THE DRAWINGS

The invention is explained in more detail below on the basis of exemplary embodiments with reference to the accompanying figures, in which.

In the figures, the same reference numerals designate components that are the same or functionally the same, unless otherwise indicated.

DETAILED DESCRIPTION OF THE INVENTION

Figure 1:
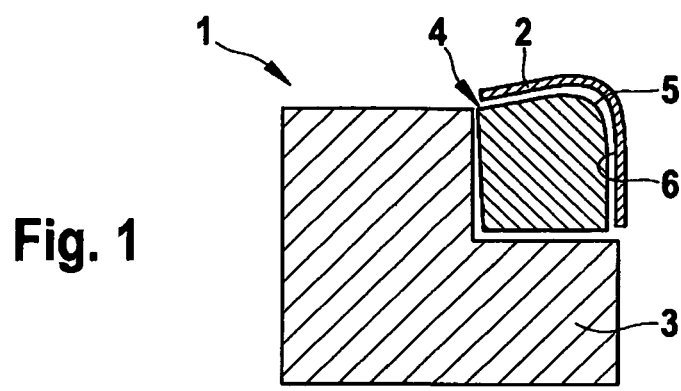
FIG. 1 shows an apparatus according to an exemplary embodiment of the present invention in a cross-sectional view.
Figure 2:
FIG. 2 shows a forming tool according to a further exemplary embodiment of the invention in a sectional view.

Seen together with FIG. 2, FIG. 1 illustrates a cross-sectional view of an exemplary embodiment of the invention which represents in principle the idea on which the invention is based.

An apparatus 1 for the forming of a lay-up 2, for example of CRP prepreg material, has a tool carrier 3 and a forming tool 4 releasably fastened to the latter. The forming tool 4 is provided with a surface contour 5 corresponding to a desired geometry of the lay-up 2 after the forming.

FIG. 1 shows the lay-up 2 in the unformed state. It has in this case a geometry 6 corresponding to the surface contour 5 of the forming tool 4.

With preference, the forming into the formed state that is represented of the lay-up 2 provided in a sheet-like form presupposes that the lay-up 2 is heated before the forming, with the result that a matrix contained in the lay-up 2 softens, and consequently the forming is made possible with little expenditure of energy or displacement of fibres in the lay-up.

If it is then intended to produce a lay-up 2 with a different geometry, according to the invention the forming tool 4 can easily and very quickly be exchanged for another forming tool 4', see FIG. 2, without handling of the tool carrier 3 being required.

Preferably, a number of the forming tools 4 are releasably fastened to the tool carrier 3, with the result that the forming tools 4 can be formed such that they are correspondingly small, and so can be handled well.

Figure 3:
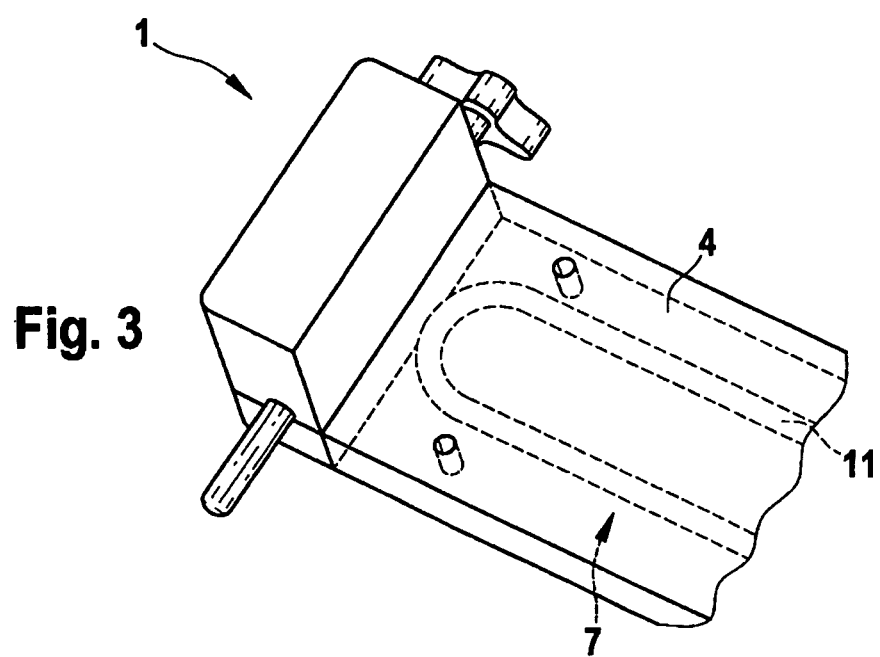
FIG. 3 shows an apparatus according to yet a further exemplary embodiment of the invention in a perspective view from above, represented in a broken-away form.
Figure 4:
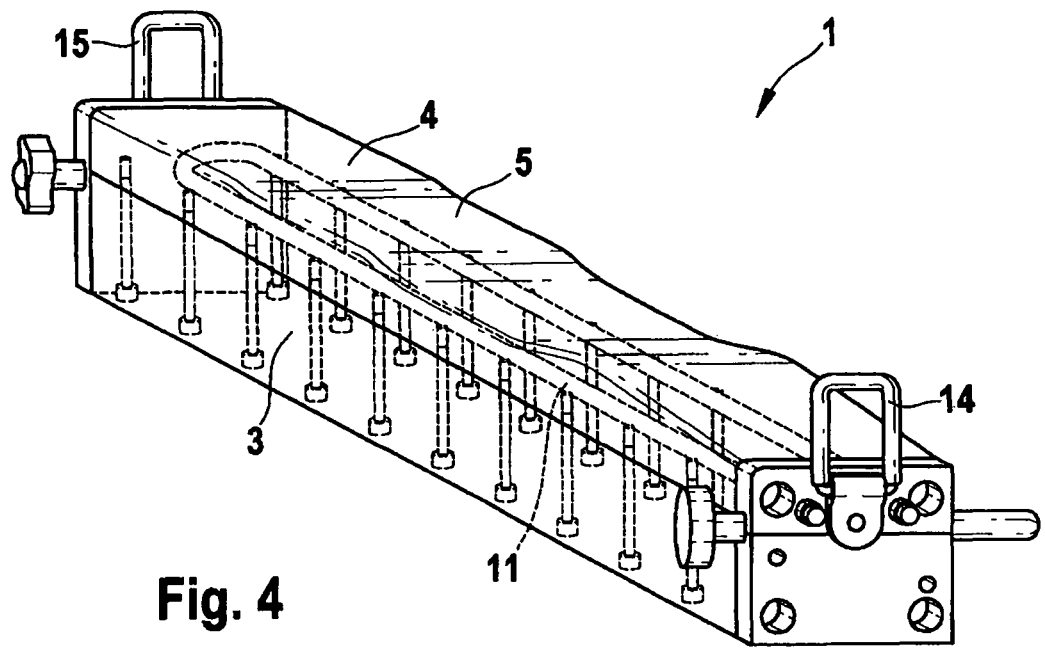
FIG. 4 shows the apparatus from FIG. 3 in a perspective side view.
Figure 5:
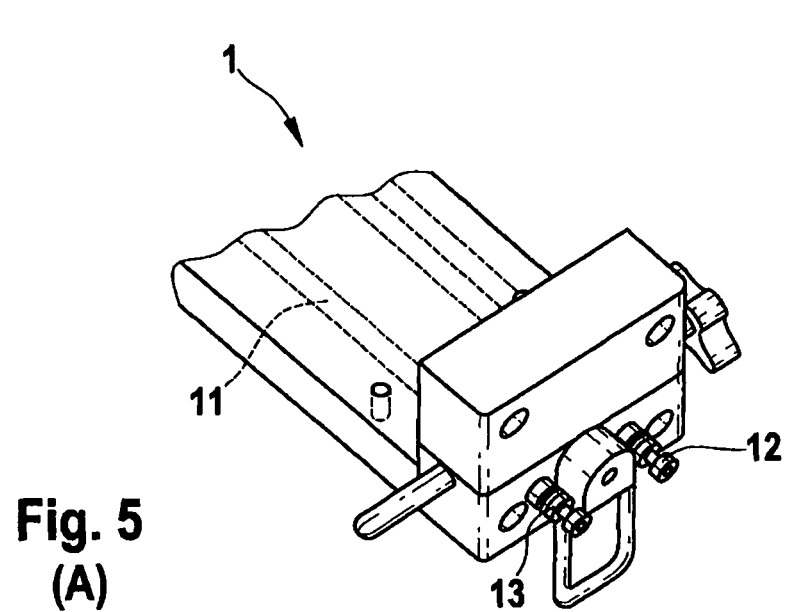
FIG. 5 shows a perspective view A from FIG. 4, represented in a broken-away form.

FIGS. 3 to 5 show a number of perspective, partly broken-away views of an apparatus 1 according to a further exemplary embodiment of the present invention, the apparatus 1 providing a heating device 7.

The heating device 7 has a fluid-carrying line 11, which runs through the forming tool 4. Before the forming operation, the line 11 is charged via a quick-acting connection 12 with, for example, pressurized hot water, which then flows through the line 11 and heats the lay-up 2 (not represented here) that has been placed on the surface contour 5 of the forming tool 4, and is discharged again via a quick-acting connection 13.

The exemplary embodiment according to FIGS. 3 to 5 has, furthermore, handling means, in particular eyelets 14, 15, which make it possible for the forming tool to be easily lifted off the tool carrier 3 for an appropriate exchange of the forming tool 4 for a further forming tool that is not represented.

Figure 6:
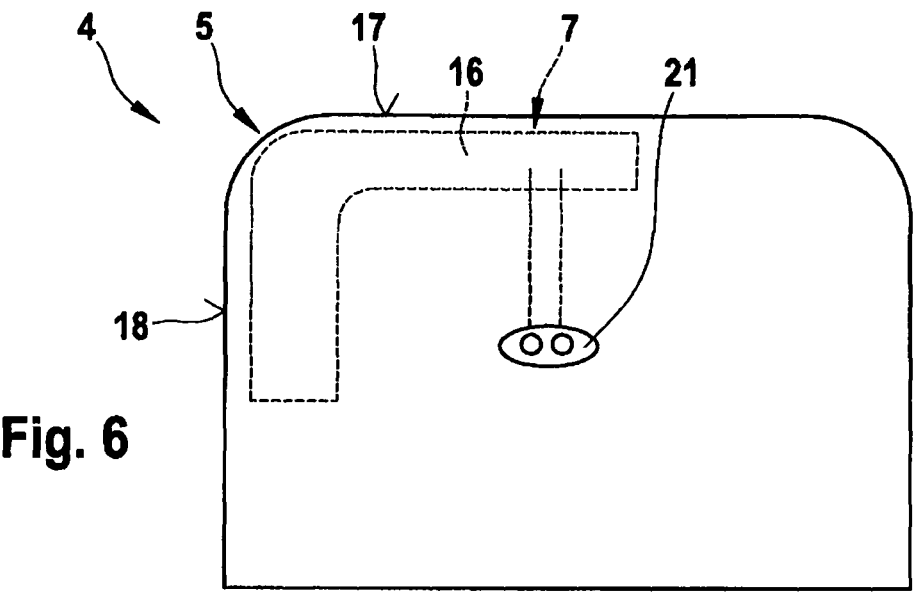
FIG. 6 shows a forming tool of an apparatus according to yet a further exemplary embodiment of the invention in a side view.
Figure 7:
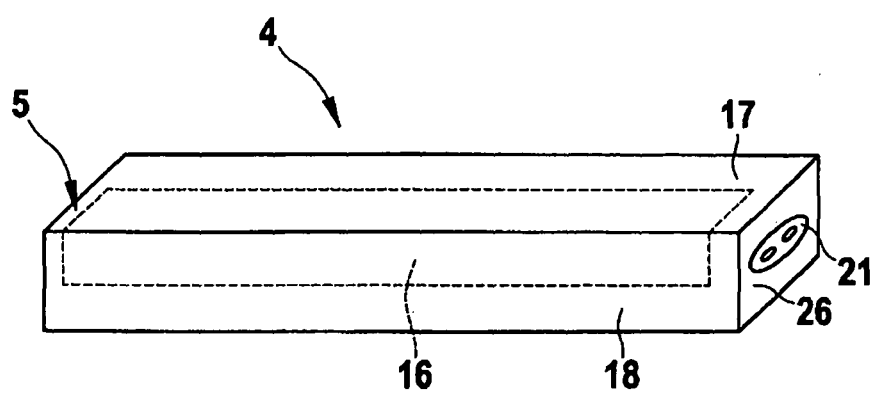
FIG. 7 shows a perspective front view of the forming tool from FIG. 6.

FIGS. 6 and 7 illustrate in a side view and perspective front view, respectively, a forming tool 4 with a surface contour 5, which has an integrated heating strip 16. Preferably, the heating strip 16 is arranged just under an outer surface 17, 18 within the forming tool 4 that is assigned to the surface contour 5.

The heating strip 16 can be connected via an electrical connection 21 to a current source that is not represented. If current is applied to the heating strip 16, it generates a heating power, which it emits to a lay-up that has been placed on the surface contour but is not represented any further.

Figure 8:
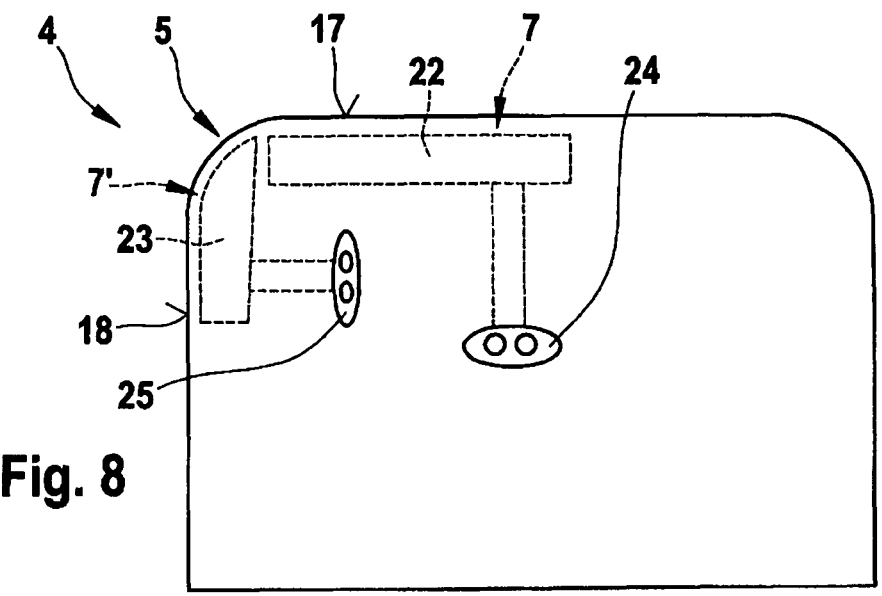
FIG. 8 shows a forming tool of an apparatus according to a further exemplary embodiment of the invention in a side view.
Figure 9:
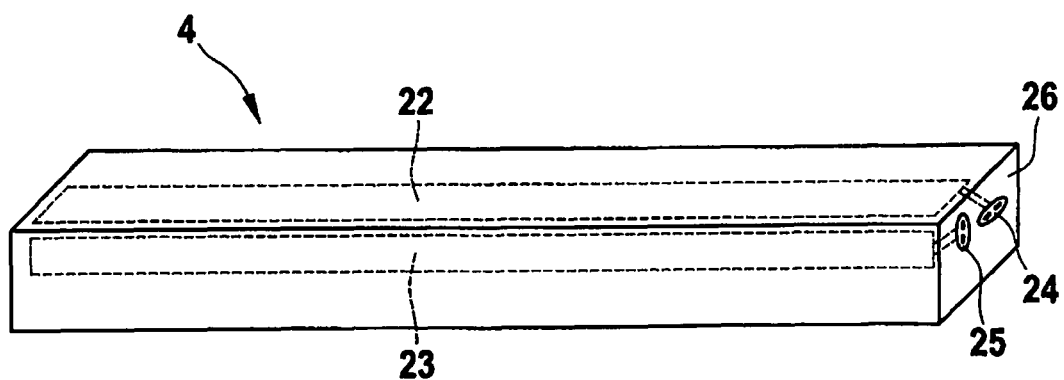
FIG. 9 shows a perspective front view of the forming tool from FIG. 8.

According to the exemplary embodiment that is shown in FIGS. 8 and 9, as a difference from the exemplary embodiment that is shown in FIGS. 6 and 7, the heating power is produced by means of two heating devices 7 and 7' that are separate from one another. The heating devices 7 and 7' that are separate from one another have heating strips 22 and 23, respectively, with in each case an electrical connection 24 and 25, respectively. The heating strip 22 serves in this case for supplying heating power to a region of the lay-up (not represented) that is in contact with the surface 17 of the forming tool 4, while the heating strip 23 serves for supplying heating power to a lay-up (not represented) that is in contact with the surface 18.

By means of regulating the electrical energy that is applied to the connections 24, 25, the heating power correspondingly generated by the heating strips 22, 23 can also be controlled. The heating strip 22 can, for example, be controlled in such a way that it generates greater heating power than the heating strip 23.

The connections 24, 25 are preferably provided on a side face 26 of the forming tool 18 in such a way that, when the forming tool 4 is connected to the tool carrier 3 that is not represented, they are automatically brought into electrical contact with electrical lines provided in the tool carrier 3.

Figure 10:
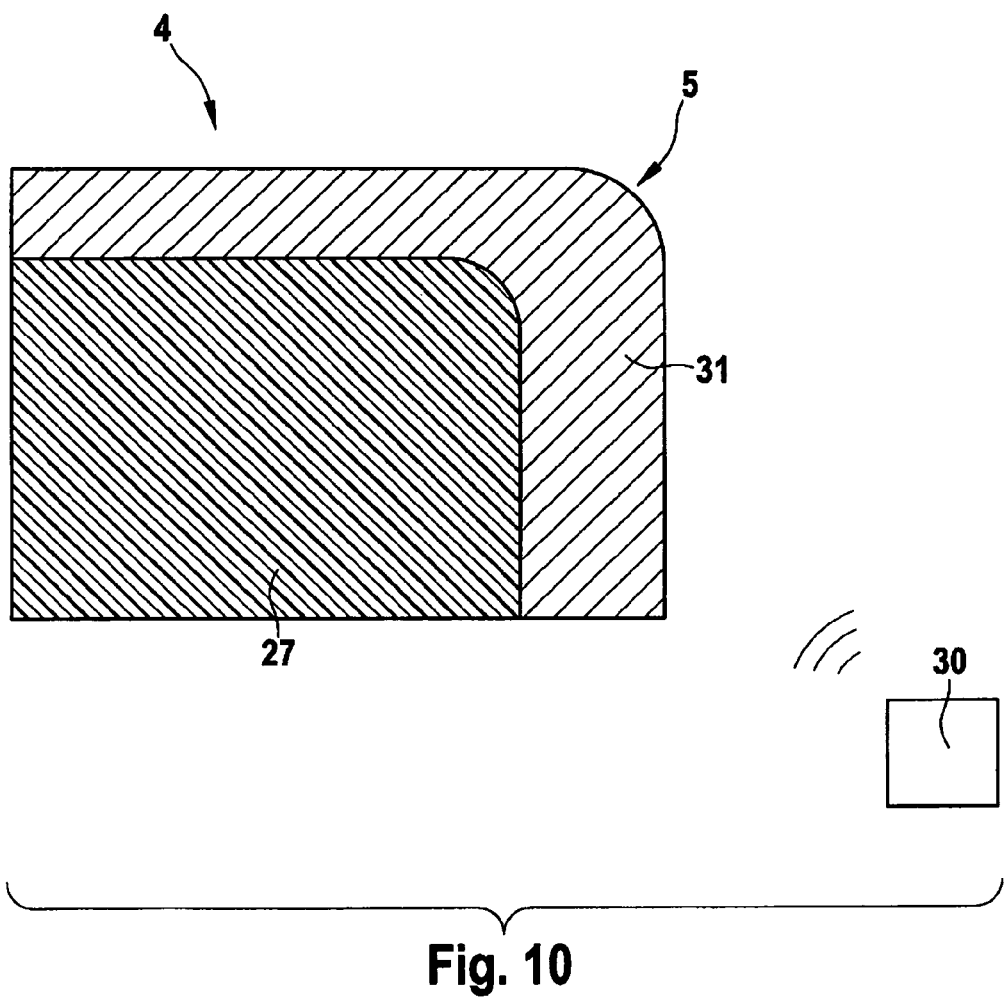
FIG. 10 shows a forming tool of an apparatus according to yet a further exemplary embodiment of the invention in a cross-sectional view.

FIG. 10 shows a forming tool 4 according to a further exemplary embodiment of the invention in a sectional view. The forming tool 4 has a carrier part 27 of a non-metal, preferably of a plastic, ceramic and/or wood, and, applied to the latter, a high-resistance coating 31 of metal or a layer of plastic and/or ceramic mixed with metal, in particular a metal powder.

The high-resistance coating 31 in this case preferably forms itself the surface contour 5 of the forming tool 4.

By way of example, an induction device 30, which is separate from the forming tool 4, is also provided, for example in the tool carrier 3. This induces a current in the high-resistance coating 31, which has the result that the latter emits heating power to a lay-up 2 that is in contact with the forming tool 4 but is not represented any further.

Alternatively, instead of the induction device 30, a device for generating microwaves and feeding them into fibres of the lay-up, and consequently heating the same, may be provided. However, in this case the entire apparatus 1 should be formed from a non-metal.

Figure 11:
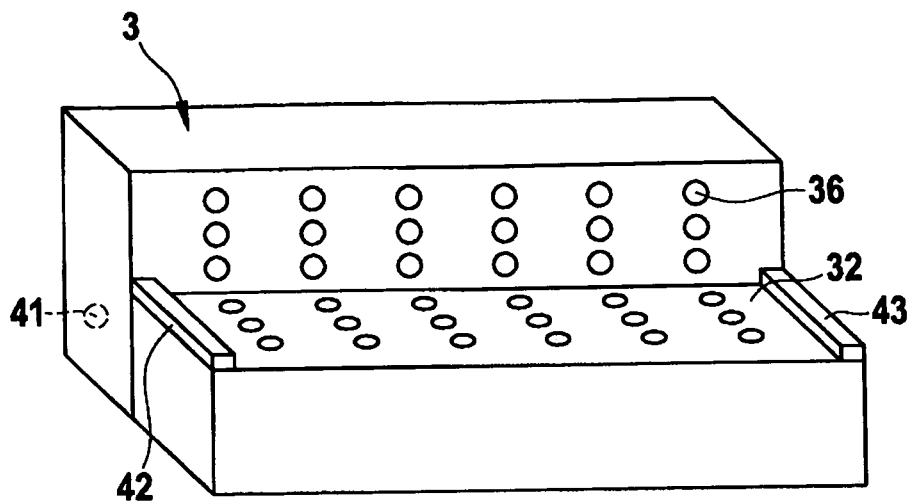
FIG. 11 shows a tool carrier of an apparatus according to yet a further exemplary embodiment of the present invention in a perspective view.
Figure 12:
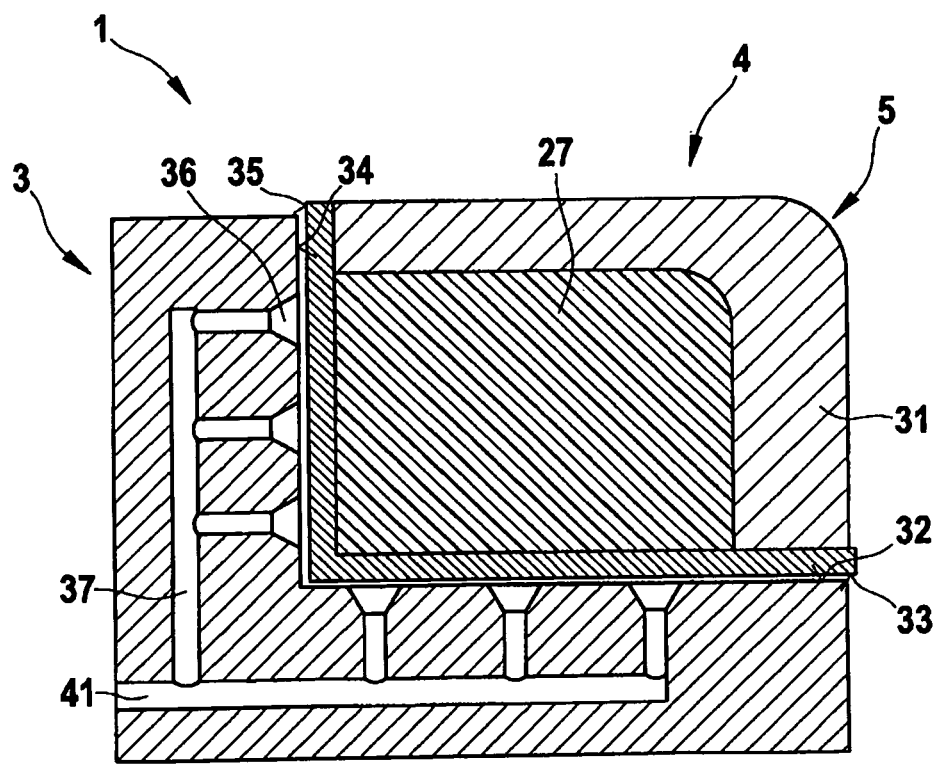
FIG. 12 shows the tool carrier from FIG. 11 with the forming tool from FIG. 10 in a cross-sectional view.

FIGS. 11 and 12 show a tool carrier 3 in a perspective view and, respectively, the tool carrier 3 from FIG. 11 in a cross-sectional view, and a forming tool 4 releasably connected to it. The forming tool 4 is, for example, the forming tool according to the exemplary embodiment that is shown in FIG. 10.

The tool carrier 3 has on a resting surface 32, for resting the forming tool 4 by a corresponding mating surface 33, and on an abutting surface 34, aligned essentially perpendicularly in relation to the resting surface 32 and serving for the abutment of a corresponding mating surface 35 of the forming tool 4, openings (provided by way of example with the reference numeral 36), which are connected to vacuum lines (provided by way of example with the reference numeral 37), in the forming tool 4.

The vacuum lines 27 are connected via a connection 41 of the tool carrier 3 to a system that is not represented any further for the controllable provision of a vacuum. If a vacuum is then applied to the connection 41 in the state represented in FIG. 12, the resting surface 32 and the abutting surface 34 are sucked against the respective mating surfaces 33 and 35 of the forming tool. Consequently, when the vacuum is applied, the forming tool 4 is connected non-positively to the tool carrier 3 in at least two spatial directions. In addition, a frictional engagement between the resting surface 32 and the abutting surface 34 and the mating surfaces 32, 33 may be produced in such a way that movement of the forming tool 4 in relation to the tool carrier 3 is prevented in a direction perpendicular to the plane of the paper in FIG. 12. Alternatively or additionally, the tool carrier 3 may be provided with suitable guiding means, for example rails 42, 43, which assist exact positioning of the forming tool 4 on the tool carrier 3 and additionally prevent slipping of the forming tool 4 in relation to the tool carrier 3 in a direction perpendicular to the plane of the paper in FIG. 12.

Figure 13:
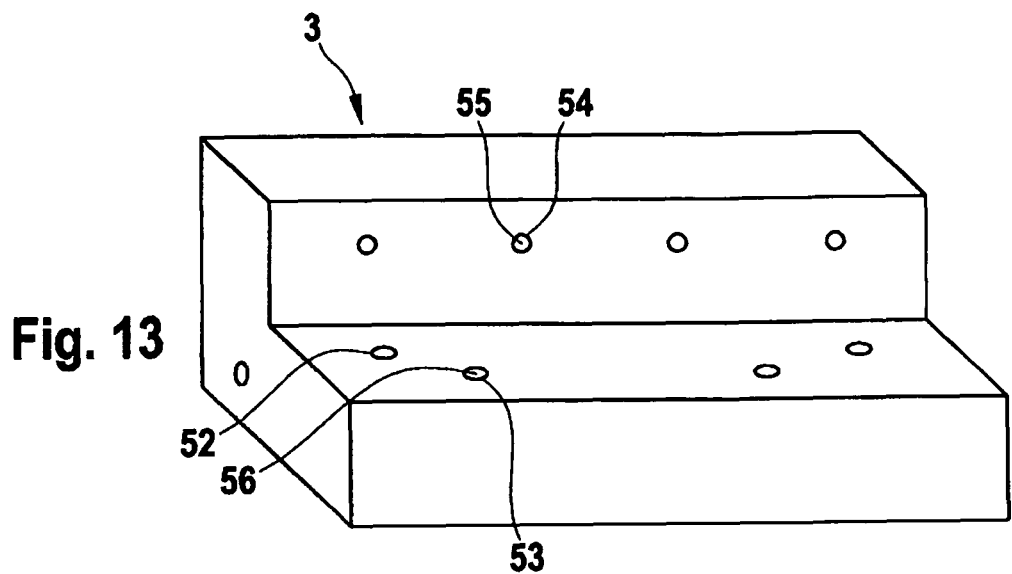
FIG. 13 shows the tool carrier of an apparatus according to yet a further exemplary embodiment of the present invention in a perspective side view.
Figure 14:
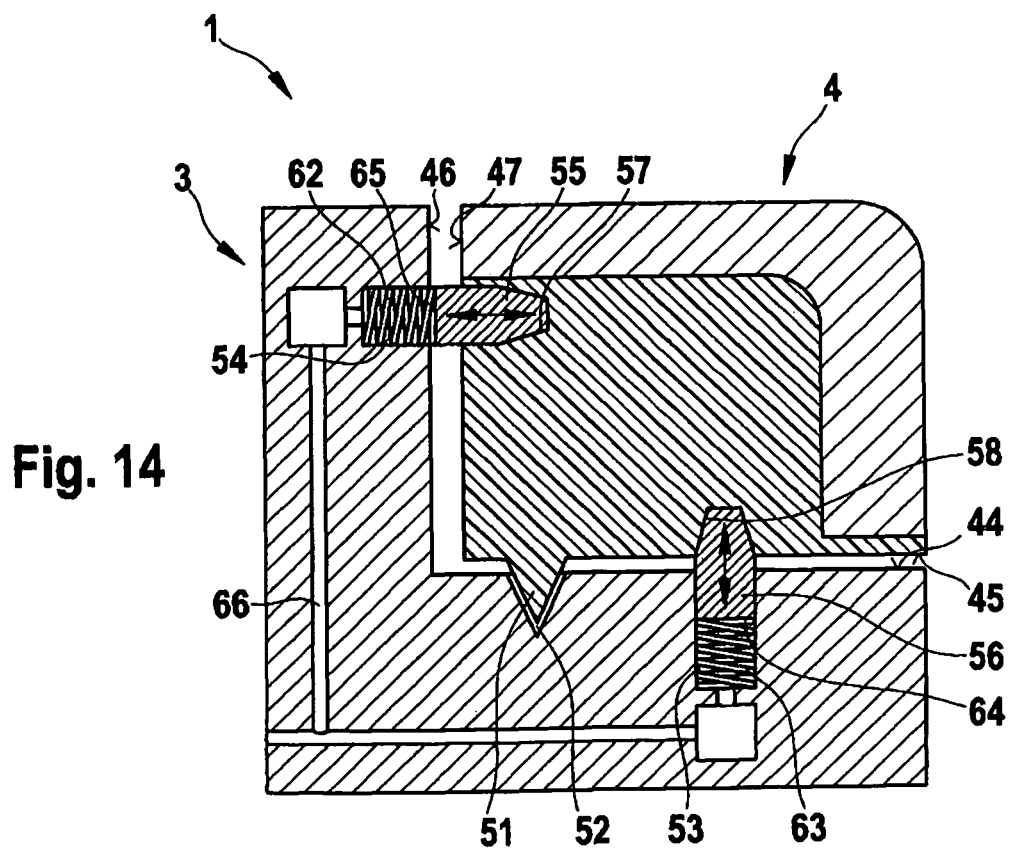
FIG. 14 shows the tool carrier from FIG. 13 with the forming tool from FIG. 10 in a cross-sectional view.

FIGS. 13 and 14 show a tool carrier 3 according to a further exemplary embodiment in a perspective view and, respectively, the tool carrier 3 from FIG. 13 with the forming tool 4 from FIG. 10, although the latter has been modified slightly, as emerges from the following description.

The forming tool 4 rests on a resting surface 44 by a corresponding mating surface 45 and butts against an abutting surface 46 by a corresponding mating surface 47, the abutting surface 46 extending essentially perpendicularly in relation to the resting surface 44.

The mating surface 45 of the forming tool 4 preferably has a peg 51, which, with a corresponding recess 52, provides positive engagement in the plane of the surfaces 44, 45 when the forming tool 4 is placed on the tool carrier 3, i.e. movement of the forming tool 4 in relation to the tool carrier 3 is prevented in the plane of the surfaces 44, 45.

The tool carrier 3 has recesses 53, 54, in which locking elements, particular bolts 55, 56, are mounted movably in one direction, preferably essentially perpendicularly in relation to the resting surface 44 or the abutting surface 46, respectively.

In the locking state represented in FIG. 14, the bolts 55, 56 engage in corresponding recesses 57, 58, preferably aligned perpendicularly in relation to one another, in the mating surfaces 45 and 47 of the forming tool 4. In this way, movement of the forming tool 4 in relation to the tool carrier 3 is prevented in any spatial direction.

Preferably, in the locking state shown in FIG. 14, the bolts 55, 56 are loaded with spring force by means of springs 62, 63.

If the bolts 55, 56 are then to be brought into a release position, releasing their engagement with the recesses 57, 58 in the forming tool 4, a vacuum is applied via lines (provided by way of example with the reference numeral 66) to a rear end 64, 65 of the bolts 55, 56 that is pointing into the recesses 53, 54. This then leads to the bolts 55, 56 being withdrawn from the forming tool 4, out of the recesses 57 and 58, respectively, and consequently to release of the said tool for exchange, for example for a different forming tool.

Although the present invention has been described on the basis of preferred exemplary embodiments, it is not restricted to these but can be modified in various ways.

Any desired combinations of materials for the tool carrier and the forming tool are conceivable. For example, the tool carrier may be formed from plastic and the forming tool from metal.

Different combinations of heating devices, for example a combination of an inductive heating device and heating device with a fluid-carrying line, are also conceivable.

The present invention provides an apparatus for the forming of a lay-up of fibre composite material, in particular in the aerospace sector. In this case the apparatus has at least one forming tool, which has a surface contour corresponding to a desired geometry of the lay-up after the forming, and a tool carrier, to which the at least one forming tool is releasably fastened. The idea on which the present invention is based is to provide an apparatus with a modular structure, it then being possible for any desired forming tools to be combined with the tool carrier according to requirements. This leads in particular to less laborious handling, since it obviates the need for handling of the comparatively large tool carrier.

What is claimed:

1. An apparatus to form a lay-up of a carbon fibre reinforced plastic composite material, said apparatus comprising:
a tool carrier;
at least one forming tool having a surface contour corresponding to a desired geometry of a formed lay-up of said fibre composite material; releasably fastened to the tool carrier by at least one of a vacuum clamping device and a locking device;
said locking device comprising at least one locking element, configured to provide a locking state for the forming tool in one plane, wherein during the locking state the forming tool is not movable in the plane but is movable in a direction perpendicular to the plane;
a device for generating microwaves,
wherein a plurality of carbon fibres of said carbon fibre reinforced plastic composite material absorb microwaves;
wherein the device for generating said microwaves is configured such that to feed said microwaves directly into said plurality of microwave absorbing carbon fibres of said carbon fibre composite material, thereby heating said plurality of microwave absorbing fibres;
wherein said heated plurality of microwave absorbing carbon fibers are adapted to heat and softening said lay-up; and
wherein said apparatus is formed at least from a non microwave absorbing material.

2. The apparatus according to claim 1, wherein the locking device has at least two locking elements, which positively connect the forming tool and the tool carrier to one another in at least two planes forming an angle in relation to one another.

3. The apparatus according to claim 1, wherein the at least one locking element is configured to be selectively moved from the locking state into the releasing state by the application of compressed and selectively moved from the releasing state into the locking state by the operation of at least one spring.

4. The apparatus according to claim 1, wherein the vacuum clamping device has at least one pressure surface fixedly connected to the forming tool and at least one pressure surface fixedly connected to the tool carrier, the apparatus being configured to apply a vacuum to between the said surfaces for fastening of the forming tool to the tool carrier.

5. The apparatus according to claim 1, wherein the apparatus comprises at least one fluid-carrying line in the forming tool or in the tool carrier.

6. The apparatus according to claim 1, wherein the apparatus comprises at least one resistance heating element in the forming tool or the tool carrier.

7. The apparatus according to claim 1, wherein at least two heating devices are provided, each of which have a region of the forming tool can be subjected to a different heating power.

8. The apparatus according to claim 1, wherein the at least one fluid-carrying line comprises a cooling fluid to cool the lay-up of said fibre composite material after being formed.

9. The apparatus according to claim 1, wherein said non-microwave absorbing material is a plastic material.

* * * * *